United States Patent [19]

Kummermehr

[11] 4,363,738

[45] Dec. 14, 1982

[54] PROCESS FOR MAKING A THERMAL INSULATING BODY

[75] Inventor: Hans Kummermehr, Ludwigshafen, Fed. Rep. of Germany

[73] Assignee: Grünzweig + Hartmann und Glasfaser AG, Ludwigshafen, Fed. Rep. of Germany

[21] Appl. No.: 194,854

[22] Filed: Oct. 7, 1980

[30] Foreign Application Priority Data

Oct. 18, 1979 [DE] Fed. Rep. of Germany ....... 2942180

[51] Int. Cl.³ .............................................. C04B 43/02
[52] U.S. Cl. ...................................... 252/62; 428/446
[58] Field of Search .................. 252/62; 428/443, 446, 428/920

[56] References Cited

U.S. PATENT DOCUMENTS

| | | | |
|---|---|---|---|
| 3,055,831 | 9/1962 | Barnett et al. | 252/62 |
| 3,176,354 | 4/1965 | Blau et al. | 252/62 |
| 3,623,938 | 11/1971 | Jenkins | 252/62 X |
| 3,625,896 | 12/1971 | Kirk et al. | 252/62 |
| 3,634,563 | 1/1972 | Asbury et al. | 264/44 |
| 4,212,925 | 7/1980 | Kratel et al. | 428/447 |
| 4,221,672 | 9/1980 | McWilliams | 252/62 |

FOREIGN PATENT DOCUMENTS 1205572 9/1970 United Kingdom .

Primary Examiner—P. E. Willis, Jr.
Attorney, Agent, or Firm—Murray & Whisenhunt

[57] ABSTRACT

In a process for making a thermal insulating body from highly insulating material, opacifier, reinforcing fiber mix and, if desired a binder, the materials are mixed together. The opacifier and/or the reinforcing fiber mix being mixed with a dispersant for forming a first-stage mix, which is then nextly mixed with the rest of the materials. The material is then compacted.

24 Claims, 2 Drawing Figures

PROCESS FOR MAKING A THERMAL INSULATING BODY

BACKGROUND OF THE INVENTION (i) Field to which the Invention Relates

The invention is with respect to a process for making a thermal insulating body from highly dispersed insulating material, opacifier, reinforcing fiber mix and, if desired a binder, these materials being mixed together and compacted.

(ii) The Prior Art

In an earlier suggestion (see German Auslegeschrift specification No. 1,671,186) for producing thermal insulating material, a mix, based on aerogel particles and inorganic fibers, is formed into the desired structures. This mix is made up of silicon dioxide or diatomaceous earth, aerogel particles and ceramic aluminum silicate or carbon fibers or mixes thereof. For the mixing operation, these materials are placed in a vessel having a turning paddle near its lower wall. After shutting the vessel, the material is swirled round by the blades of the paddle and so completely mixed. In a preferred form of the invention, an opacifier undergoes addition to the aerogel and fiber material before mixing. Nextly, all the materials undergo mixing in a vessel with a turning paddle.

As a rule such silica-aerogel particles have a diameter under 1 micron and because of their high-bulk structure have a low density. Because such a thermal insulating material is made up for at least 50% of such an aerogel, nearly the full space taken up by the body produced of such thermal insulating material is filled with aerogel particles and the air round them, the fiber materials and the opacifier hardly taking up any of the volume.

In mixing tests, it has turned out that it is very hard to make up a mix containing 50% of aerogel particles and containing, furthermore, reinforcing fiber material and/or opacifier. In fact, if the addition is made of relatively small amounts of opacifier and/or fiber material to a great amount of aerogel material, no evenly mixed product will be produced even after stirring or agitating for a number of hours. In fact, complete mixing is only possible by the turning paddle in a limited part of the vessel while the material over the paddle is only moved very slowly downwards to undergo complete mixing. It may frequently be the case that the paddle, turning at a high speed, will be heated by the mixing operation while, on the other hand, not being able to undertake the mixing operation with the desired outcome. Such an unhomogeneous mixing operation naturally makes for a lower quality of the end product, its coefficient of thermal conduction and heat reflexion properties being decreased.

SHORT OVERVIEW OF THE INVENTION

For this reason, one purpose of the present invention is that of designing a process for producing a thermal insulating body so that, even in the simplest form of the process and with a simple system a homogeneous mix of insulating material particles, fiber mixes and/or opacifier particles (even if when the amount of the insulating material is greater than 50% of the weight of the other materials) is produced.

This purpose and further purposes are effected in the present invention in that the opacifier and/or the reinforcing fiber mix are mixed with a dispersant for forming a first-stage mix, which is then nextly mixed with the rest of the materials.

If the opacifier and/or the reinforcing fiber mixes are mixed with the dispersant and if the first-stage mix so produced is put together with the fine insulating material particles, making up by far the greatest part of the end-stage mix, it will be seen, surprisingly, that the first-stage mix is very readily broken up and distributed in the insulating material substance. This certainly seems to be because of the fact that the dispersant has the effect of breaking up the agglomerates formed by the opacifier and/or the fibers, and then keeps them spaced from each other. Such agglomerates may be broken up only if great care is used, because the forces acting between the particles and responsible for forming the agglomerates, may be put to an end by a dispersing process step and/or substances with a dispersing effect. Because of the separating of the separate opacifier particles one from the other or of the fiber substances, further mixing with high-bulk particles, having a tendency towards agglomeration as well, is made much more readily possible, because such high-bulk particles or the agglomerates made up thereof, may go into position between the separate, spaced opacifier particles and/or fiber substances. A specially useful effect is to be produced if the dispersant and the insulating material are the same, because the separating step, undertaken even in the first-stage mix, is responsible for a very readily possible breaking up of the opacifier and/or the fiber material in the insulating material, something which in fact has the effect of thinning or diluting such materials.

As opacifiers, which are put in the mix for increasing the thermal reflexion, it is possible to make use of organic or inorganic compounds having the property of dispersing, absorbing or reflecting thermal radiation, the selection of such substances being made with the temperature of use in mind. The grain size of such opacifiers is normally in a range of 0.5 to 20 microns, and, more specially 1 to 10 microns, the maximum of the frequency distribution best being between 2.5 and 5 microns. Opacifiers which, for example, may be used are graphite and carbon black, if the temperature is not overhigh, inorganic oxides of titanium, possibly containing ferric oxide (ilmenite), rutile, chromium oxide, manganese oxide, iron oxide and carbides of silicon, boron, tantalum or tungsten of mixes thereof. Furthermore, metallic aluminum, tungsten or silicon, zirconium, titanium dioxide or lead monoxide and further materials may be used having a high index of thermal reflexion or IR-refraction. These opacifiers may undergo addition up to a level of 60% of the weight of the thermal insulating body. The selection of the opacifier level will, in this respect, be dependent on the thermal radiation in question, the opacifier level increasing with an increase in temperature. A further useful effect of the opacifier is that, because its grain size is greater than that of the insulating material, it is able to take up a great amount of space or a great amount of the interstices so that the thermal conductivity of the end product is decreased and the thermal quality increased.

A more specially preferred opacifier is ilmenite, $FeTiO_3$, because it has a very low price and, furthermore, is readily milled. This opacifier may be contaminated with chemically bound manganese (Mn).

A reinforcing function may furthermore be undertaken by all organic and inorganic fibers, which are responsible for better mechanical properties of the thermal insulating body, and, more specially, the properties of its outer faces. Such fibers are, for example, mineral fibers, for example basalt fibers or glass fibers, asbestos fibers, aluminum silicate fibers, man-made organic fibers based on polyamides, polyacrylic acid or viscose. The fiber diameter is in this respect to be within a range of 1 to 20 and, more specially 5 to 10 microns. The length of such fibers is generally in a range of some millimeters to some centimeters. The amount of reinforcing fibers may be up to a level of 40% of the weight of the mix.

As a dispersant, it is possible to make use of hydrophobic inorganic or organic substances, as for example hydrophobic silica, pyrogenic silica or polymers such as polytetrafluoroethylene, hydrophobic silica, however, being best because of its low price.

This dispersant, whose grain size may even be under 1 micron, is intimately mixed with the opacifier in a weight ratio of 2:98 to 30:70 and, more specially, 10:90. This first-stage mix is mixed with the other materials of the thermal insulating body in a mixing apparatus till an even and very fine distribution of the materials has been made certain of. The dispersant undertakes in this respect the function of a spacer from the other substances in the thermal insulating body so that the single binder particles will be present with an even distribution in the insulating compound without any signs of agglomerating or clumping. For this reason, the dispersant is not only used as a spacer spacing the separate particles of insulating material, but furthermore as mixing adjuvant.

If the opacifier is still to be milled down to the desired grain size, this may be undertaken in the presence of the dispersant because agglomerating or clumping together is stopped thereby with good effect. In this case, before mixing into the insulating material, the opacifier is intimately mixed with the dispersant and then milled down to the desired grain size.

As a particulate insulating material, it is possible to make use of powder or fiber particles or mixes thereof. In this respect, it may be a question of agglomerates of finely distributed particles with a grain size of 0.1 micron, which have a pipe-like or pored structure. Such insulating materials are, for example, quartz and glass fibers, aluminum, silicate fibers and further ceramic fibers, powder-form aluminum or mixes made up of fly-ash with expanded diatomaceous earth, fine-grain aluminum or chromium oxide and aerogels, for example of silica, chromium oxide, thorium oxide, magnesium, hydrate, aluminum oxide or mixes thereof.

Such aerogels may, in the present invention, not only be used as insulating material, but furthermore as dispersants, if they have an aggregate-splitting structure or are hydrophobised.

A further example of such insulating materials is pyrogenic silica, produced by the chemical decomposition of silicon tetrachloride. The size of these grains or particles will be in a range of 10 Å-2 mm and, more specially, under 1 micron. Generally, the heat insulating body will be made up for 95% of this insulating material, the more specially used range being 30 to 85% of insulating material.

If after mixing and compacting or consolidating such materials the thermal insulating body produced is acted upon by a normal force, it will be seen that, because of its poor mechanical properties, it is not able to be used so that, for this reason, the body has to be put in a casing, as for example a sack, or has to be made hard or cured with special-purpose binders for producing the desired mechanical stiffness and strength.

As a binder, it is possible to make use of all inorganic or organic binders, which may be decreased to a grain size down to a level under 1 micron by grinding, and which become soft or melted under 700° C. so that they become compounded with the insulating material particles round them. The grinding of the binder particles down to a size of generally 1 micron or less, is responsible for producing binder particles which, while having an even distribution in the insulating body, make certain of a high mechanical strength and stability. The upper temperature limit of about 700° C. is to be kept to because at higher temperatures, sintering of the insulating material particles will be started, this being responsible for a loss in the thermal insulating properties of the insulating body.

Inorganic-based binders are, for example, low-melting point glasses, glass-forming materials, glass solders, phosphates, sulfates, carbonates, hydroxides or oxides of the alkali metals and alkaline earth metals, sodium silicates, borates, borax, sodium perborate and mixes thereof. More specially soda or sodium sulfate is used, the addition being made of some fine-grained carbon black to the sodium sulfate for reducing it.

Examples for organic-based binders are phenol-formaldehyde synthetic resins, urea formaldehyde synthetic resins, thermoplastic resins such as PVC resins or copolymers of vinyl chloride and vinyl acetate, polyurethane granulates, polyamides, polyethylene, silicone synthetic resins and the like. More specially, formaldehyde resins or methylsilicone synthetic resins are used after a process of fine grinding.

Generally, the amount of the binder used is worked out in a way dependent on the desired stiffness and flexibility of the board or plate, the desired outcome generally being produced if, by the addition of the binder, the board is made resistant to abrasion. For this reason, the binder amount is generally 2 to 30%, and more specially 5 to 10% of the weight of the insulating material.

On the other hand, the pressed mix may be housed in a casing, noted for example in German Pat. No. 1,954,992. In the casing the thermal insulating body is under such a pressure that, while being fully resistant to mechanical loads, nevertheless has good thermal insulating properties.

In the process of the present invention for producing the thermal insulating body, the first-stage mix is produced by mixing the opacifier and/or the reinforcing fibers with the dispersant in a normal mixing apparatus using 2 to 30%, and more specially 10% by weight of dispersant and the necessary amount of opacifier. The ingredients of this mix are then run separately into the mixing apparatus, mixing then being undertaken till an even mix has been produced. Dependent on the material used, the mixing time will be between 5 second and 5 minutes and more specially 20 to 50 seconds. The first-stage mix so produced has a very fine even distribution of the ingredients, it being free, more specially, of agglomerates or fiber bodies of great size. This first-stage mix undergoes addition to the rest of the insulating substance, the last-named then being mixed as well for up to 5 minutes and, more specially, for 20 to 50 seconds. The end-stage mix so produced may be made up, for example, for 60% of its weight of pyrogenic silica and 40% of first-stage mix.

In a preferred working example of the invention, for forming the first-stage mix, 10% of pyrogenic silica, used as an insulating material as well, and 90% of opacifier, as for example ilmenite, are used.

This end-stage mix is then pressed in a press to boards or other moldings, then undergoes heat processing, if binder has been used. If the end-stage mix has been produced without binder and, for this reason, been placed in a sack before pressing, such a sack undergoes pressing, the pressure generally being between 0.07 and 21 kg per square cm or at a value greater than this. Usefully, a parting substance is placed between the press and the insulating material.

On using a binder, the board or molding so pressed undergoes heat processing in a stove or oven or in a HF or microwave heating apparatus.

The end product so produced has high-level heat insulating properties and may be used, for example, in heat-storing heaters and the like.

LIST OF FIGURES

In the figures working examples of the insulating body of the invention will be seen.

DETAILED ACCOUNT OF WORKING EXAMPLES OF THE INVENTION

Figure 1:
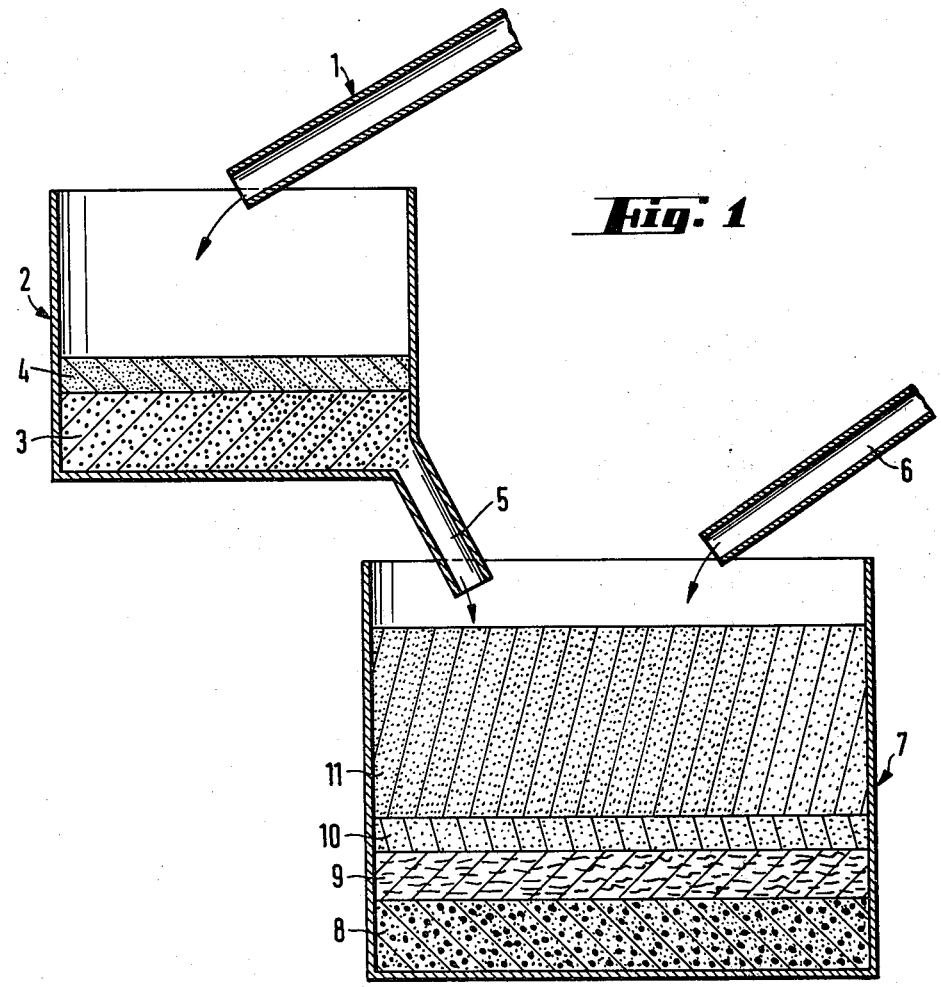
FIG. 1 is a diagrammatic view of the apparatus for producing the first-stage mix and the end-stage mix.

As will be seen from the diagrammatic FIG. 1, the materials, to be processed for making a first-stage mix, are run by way of a pipe 1 into the first-stage mixer 2, the opacifier 3 and the pyrogenic silica 4 undergoing addition together. The order in which addition of the materials takes place in unimportant. After this, in this first-stage mixing apparatus, mixing takes place for 30 to 40 seconds, if opacifier is used, and for 3 to 4 minutes if mineral fiber wool is used. The first-stage mix so produced is made up of 2 to 30 and, more specially, 10% of dispersant (pyrogenic silica) if opacifier is to be mixed in and up to 50 and, more specially, 25 to 30% by weight of dispersant, if reinforcing fiber is used. The first-stage mix so produced goes by way of pipe 5 into the main mixing vessel 7, which has further pipes, for example pipe 6 for the addition of the other materials, opening into it. After placing the first-stage mix 8 into main mixing vessel 7, the reinforcing fiber 9 and the pyrogenic silica 10 are run in in the amount as noted for the fiber mix. The reinforcing fiber may, however, be milled as well in a further first-stage mixing apparatus with the pyrogenic silica and undergo addition to the main mixing apparatus as a further first-stage mix. Furthermore, it is possible for opacifier, together with the reinforcing fiber, to be mixed in a first-stage mixer with the silica. However, in all cases, the material ratios as noted are to be kept to if opacifier and/or reinforcing fiber are to be dispersed. After the addition of the rest of the silica 11, which is with respect to the main part of the mix, the end-stage mix is mixed in the main mixing apparatus 7 for a further 30 to 40 seconds. The end-stage mix so produced is then run into a filling station and then into a press.

Figure 2:
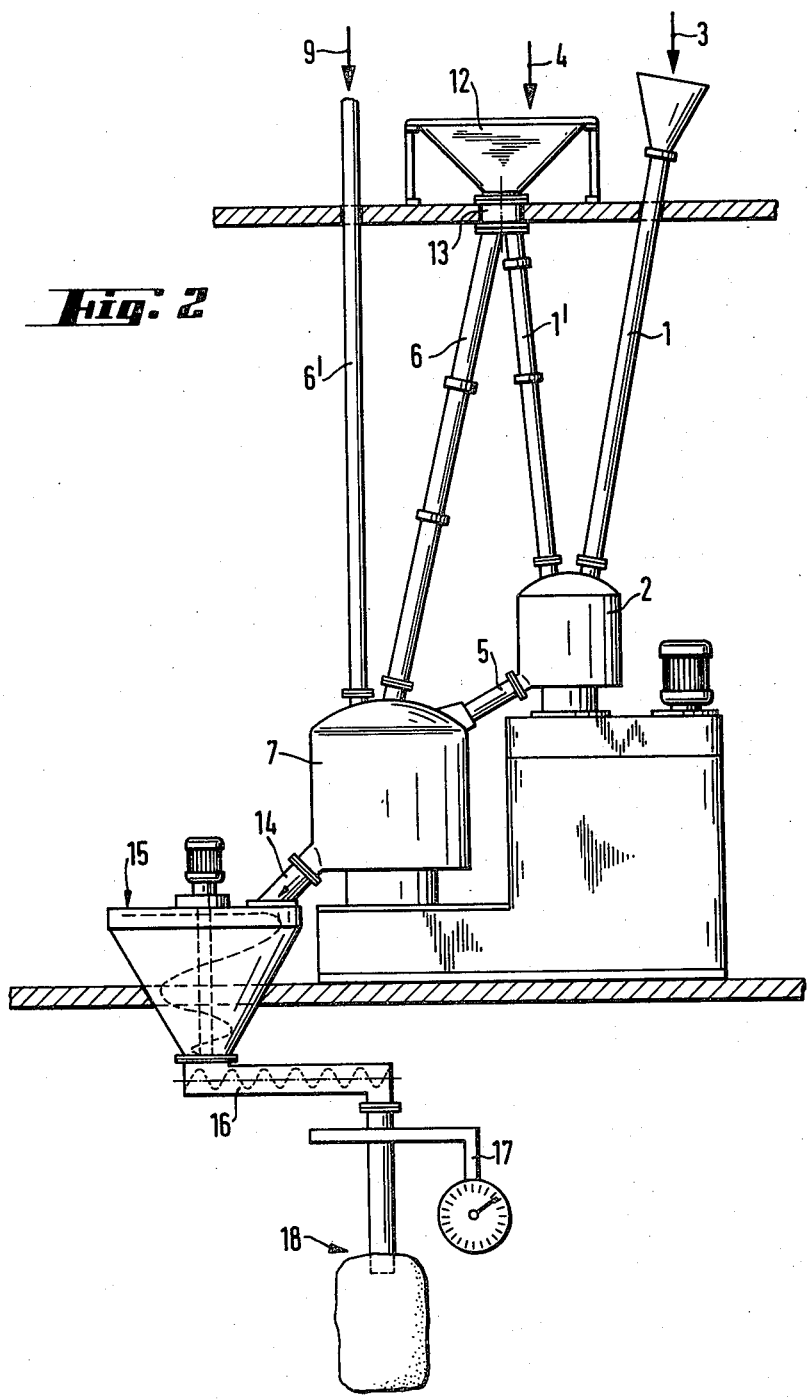
FIG. 2 is a diagrammatic, general view of the mixing and filling station.

FIG. 2 gives a general view of the complete process operation as far as the filling station. The opacifier 3 is run by way of pipe 1 into the first-stage mixing vessel 2, while the silica 4 is run in by way an input hopper 12, joined up by way of a valve 13 with pipes 1' and 6. By way of pipes 1 and 1', the ingredients of the mix are run into the first-stage mixing vessel 2, in which they are mixed and then go, by way of pipe 5, after such mixing, into the main mixing apparatus 7. The reinforcing fiber 9 goes by way of pipe 6' into the main mixing apparatus 7, into which the amount of silica necessary for mixing in the reinforcing fiber, goes by way of pipe 6. The first-stage mix 8, the reinforcing fiber 9 and the silica 10 are mixed in main mixing apparatus 7. After this, the rest of the silica is run in by way of pipe 6 into the main mixing apparatus 7, where the end-stage mix is produced. This mix is then run out through an outlet pipe 14 into a hopper 15 for storing, for which it is taken by a screw conveyer 16 and goes to a weighing apparatus 17 on its way to the filling station 18. This filling station 18 may be in a press itself, if no filling into sacks takes place beforehand, such sacks being pressure-processed as well in a press. After the press, there is furthermore a heating apparatus, to be used if the thermal insulating body has a binder, which is to be cured.

I claim:

1. In a process for making a thermal insulating body by mixing together the ingredients of a highly insulating particulate material, an opacifier and reinforcing fibers, and then compacting the resulting mixture, and wherein the highly insulating material is the major ingredient, the improvement wherein the opacifier and/or the reinforcing fibers are first mixed with a dispersant for said opacifier or fibers to form a first-stage mix, and then mixing the said first-stage mix with the remainder of the said ingredients, prior to compacting.

2. A process as claimed in claim 1, wherein an organic or inorganic compound is used as an opacifier.

3. A process as claimed in claim 1 or claim 2 wherein the grain size of the opacifier is from 0.2 to 20 microns with a maximum of the frequency distribution being between 2.5 and 5 microns.

4. A process as claimed in claim 3, wherein the grain size of the opacifier is from 1 to 10 microns.

5. A process as claimed in claim 3 wherein the opacifier is selected from the group consisting of graphite, carbon black, inorganic oxides of titanium, ilmenite, rutile, chromium oxide, manganese oxide, iron oxide, carbides of silicon, boron, tantalum, tungsten and mixtures thereof.

6. A process as claimed in claim 3 wherein the dispersant/opacifier rate ratio is in a range of 2:98 to 30:70.

7. A process as claimed in claim 1 or claim 2 wherein the opacifier is selected from the group consisting of graphite, carbon black, inorganic oxides of titanium, ilmenite, rutile, chromium oxide, manganese oxide, iron oxide, carbides of silicon, boron, tantalum, tungsten and mixtures thereof.

8. A process as claimed in claim 7 wherein the dispersant/opacifier rate ratio is in a range of 2:98 to 30:70.

9. A process as claimed in claim 7, wherein the opacifier is ilmenite ($FeTiO_3$).

10. A process as claimed in claim 9 wherein the ilmenite is contaminated with maganese.

11. A process as claimed in claim 1, wherein the reinforcing fiber is selected from the group consisting of asbestos fibers, aluminum silicate fibers, mineral fibers and organic fibers.

12. A process as claimed in claim 11, wherein an aluminum silicate fiber mix is used as the fibers.

13. A process as claimed in claim 11, or claim 12, wherein the fiber diameter is in a range of 1 to 20 microns.

14. A process as claimed in claim 13 wherein the said fiber diameter is in a range of 5 to 10 microns.

15. A process as claimed in claim 13 wherein the dispersant/opacifier rate ratio is in a range of 2:98 to 30:70.

16. A process as claimed in claim 1 wherein the thermal insulating body includes a binder.

17. A process as claimed in claim 1, wherein the dispersant is in the form of hydrophobic or pyrogenic silica.

18. A process as claimed in claim 17, wherein the grain size of the dispersant is under 1 micron.

19. A process as claimed in claim 1, 2, 11, 12, 17 or 18 wherein the dispersant/opacifier rate ratio is in a range of 2:98 to 30:70.

20. A process as claimed in claim 19 wherein the said ratio is 10:90.

21. A process as claimed in claim 1, 2, 11, 12, 17 or 18, wherein the addition of the dispersant to the fibers, to be processed for forming a first-stage mix, is in an amount of up to 50% by weight.

22. A process as claimed in claim 21 wherein the said amount of dispersant is 25% to 30% by weight.

23. A process as claimed in claim 1, 2, 11, 12, 17 or 18 wherein the said first-stage mix is produced by milling and the opacifier is mixed with the dispersant prior to said milling.

24. The product produced by the process of claim 1.

* * * * *